(12) United States Patent
Hiruma

(10) Patent No.: US 7,224,418 B2
(45) Date of Patent: May 29, 2007

(54) METHOD, PROGRAM, AND APPARATUS FOR MANUFACTURING ELECTROOPTICAL PANEL, AND METHOD FOR MANUFACTURING ELECTRONIC DEVICE

(75) Inventor: Kei Hiruma, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/851,985

(22) Filed: May 21, 2004

(65) Prior Publication Data
US 2005/0007520 A1    Jan. 13, 2005

(30) Foreign Application Priority Data
May 22, 2003  (JP)  ............... 2003-144501

(51) Int. Cl.
*G02F 1/1333* (2006.01)
(52) U.S. Cl. .................. 349/86; 349/187; 349/189; 349/190
(58) Field of Classification Search ........... 252/299.01; 349/86, 89, 187, 43, 189, 190; 347/104
See application file for complete search history.

(56) References Cited
U.S. PATENT DOCUMENTS
6,001,203 A * 12/1999 Yamada et al. ............ 156/106
6,752,486 B2 * 6/2004 Goto ........................ 347/40
2004/0207797 A1 * 10/2004 Sakurada ................... 349/153
2004/0207800 A1 * 10/2004 Hiruma et al. .............. 349/189

FOREIGN PATENT DOCUMENTS
JP   09-311340    12/1997
JP   10-123537     5/1998
JP   11-109388     4/1999

OTHER PUBLICATIONS
Communication from Korean Patent Office regarding counterpart application.

* cited by examiner

Primary Examiner—David Nelms
Assistant Examiner—(Nancy) Thanh-Nhan Phan Nguyen
(74) Attorney, Agent, or Firm—Harness, Dickey & Pierce, P.L.C.

(57) ABSTRACT

A liquid-crystal droplet accreting onto an alignment layer spreads in a wet state but the diameter of the liquid-crystal droplet does not become greater than a certain size. When the diameter of the liquid-crystal droplet in that state is represented by $D_{max}$ and is defined as the largest wet-spread diameter of the liquid-crystal droplet, the liquid-crystal droplet is dropped on a substrate such that the spacing I between the drop center C of the liquid-crystal droplet and the inner edge of the sealant (the edge of the sealant close to a display area) is greater than half of the largest wet-spread diameter $D_{max}$ of the liquid-crystal droplet.

9 Claims, 15 Drawing Sheets

[FIG. 1]
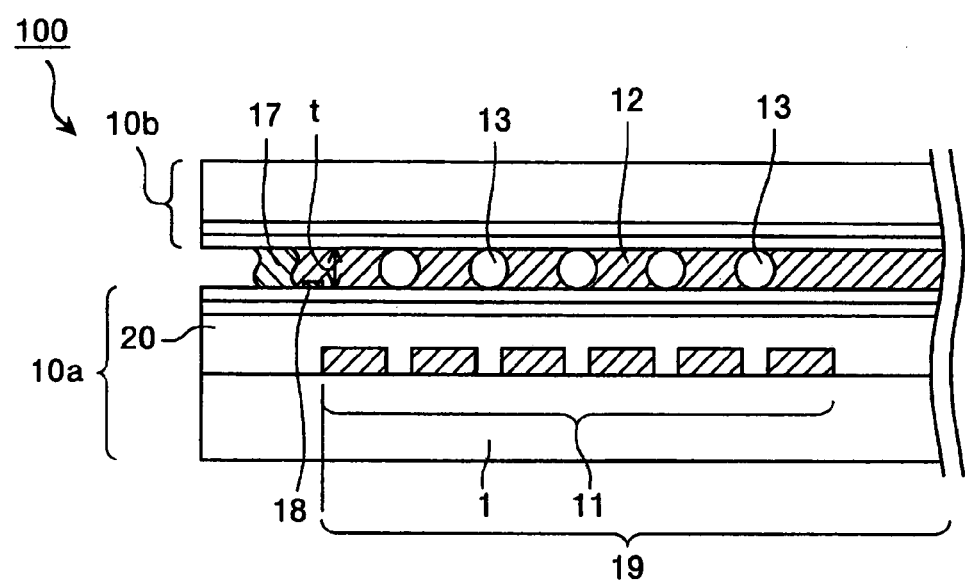

[FIG. 2]
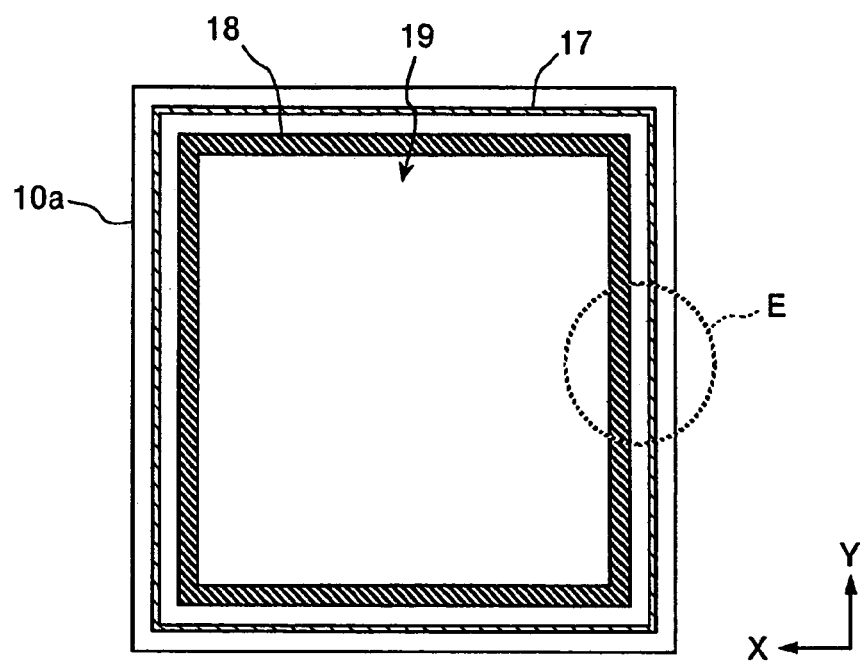

[FIG. 3]
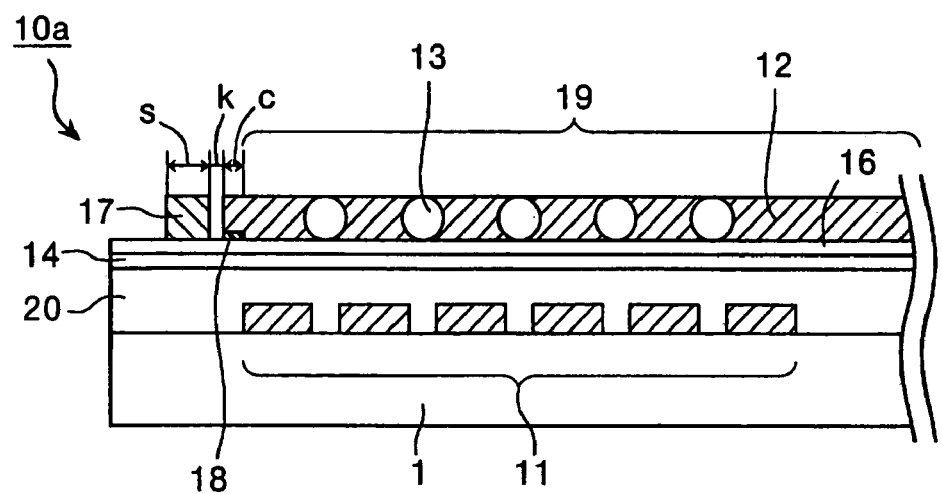

[FIG. 4a]
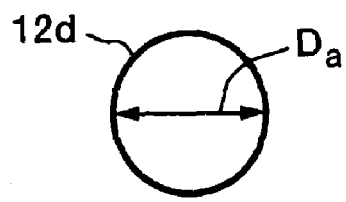
[FIG. 4b]
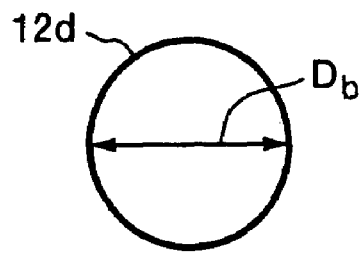
[FIG. 4c]
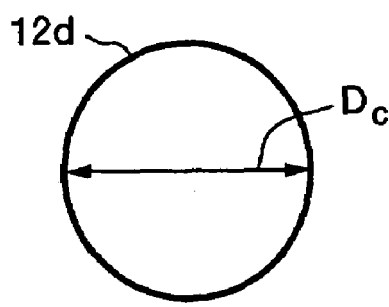
[FIG. 4d]
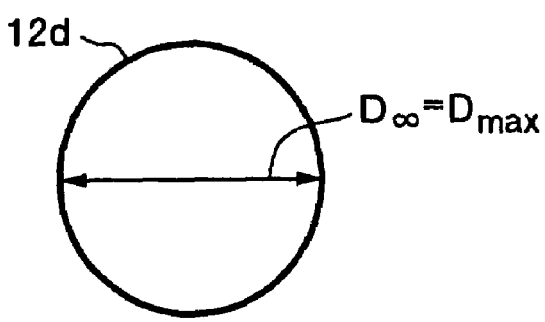

[FIG. 5]
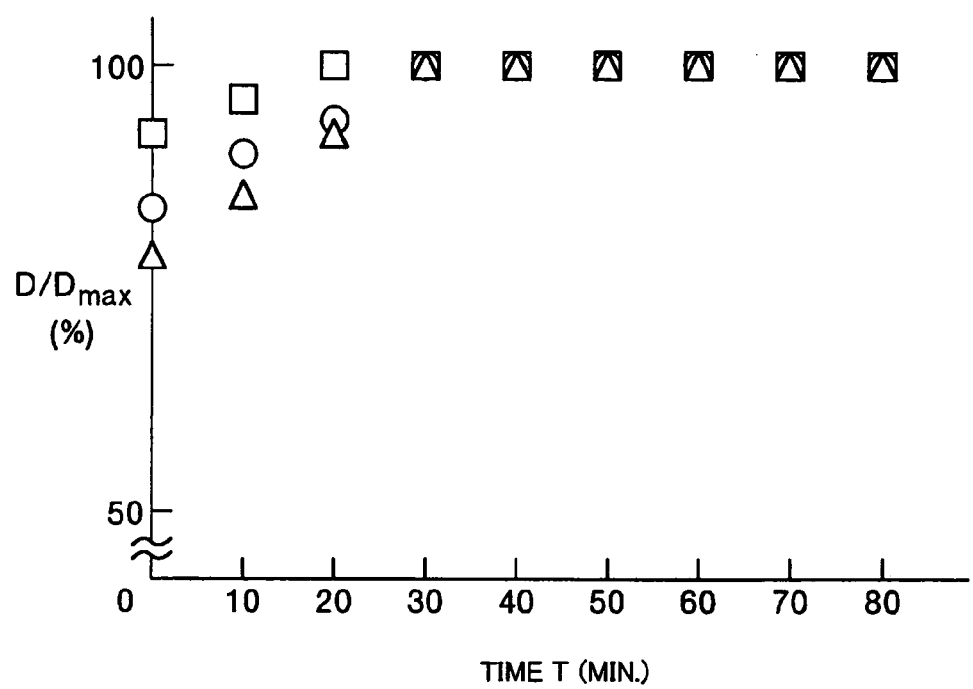

[FIG. 6]
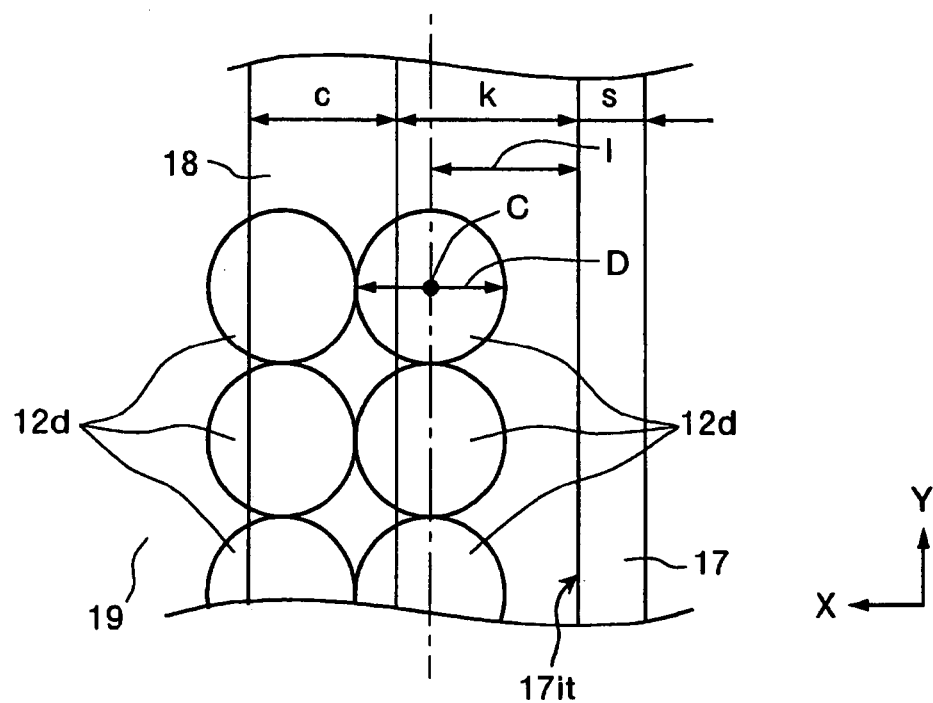

[FIG. 7]
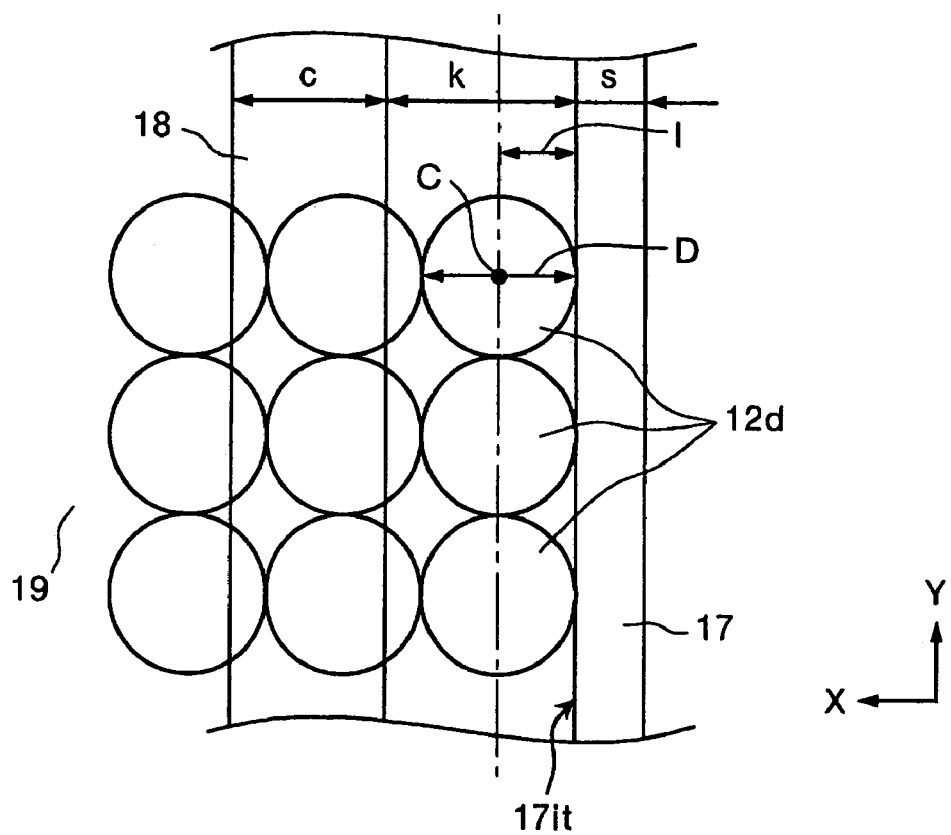

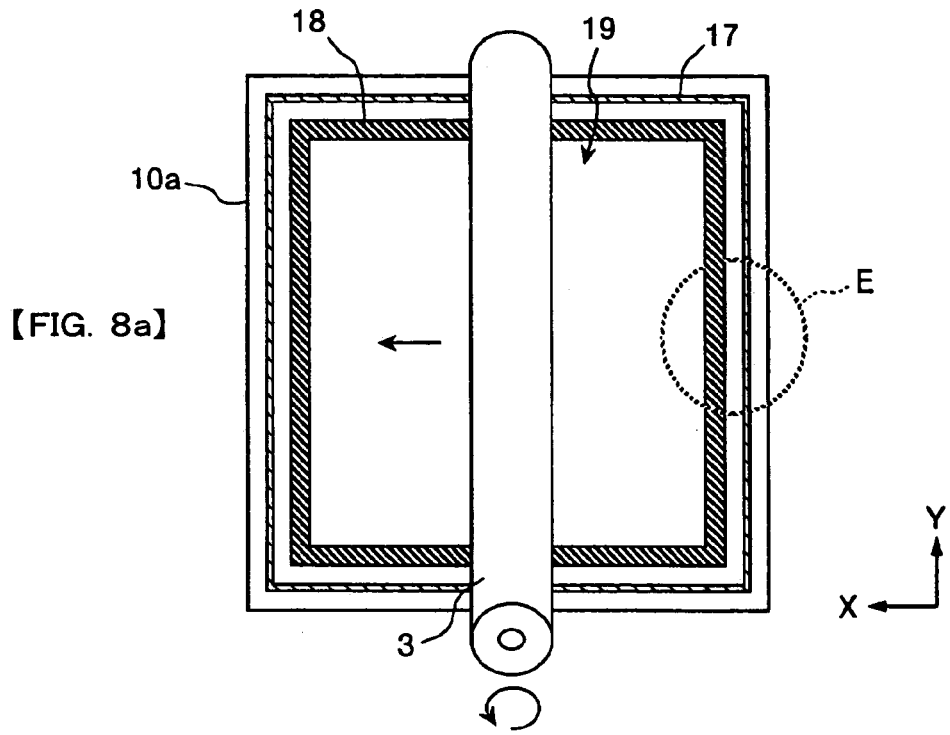
[FIG. 8a]
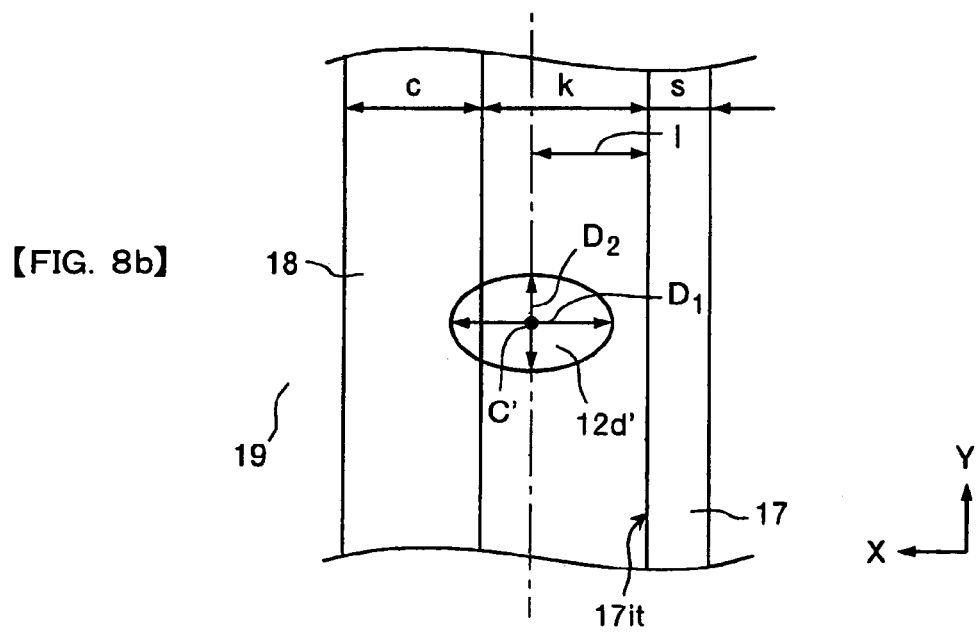
[FIG. 8b]

【FIG. 9】
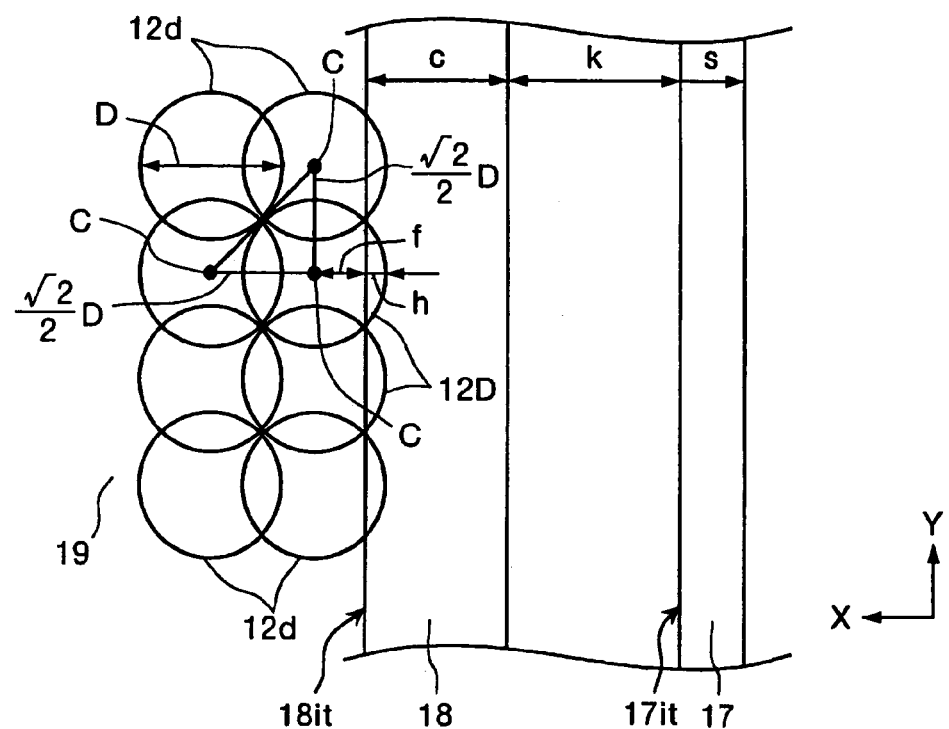

[FIG. 10]
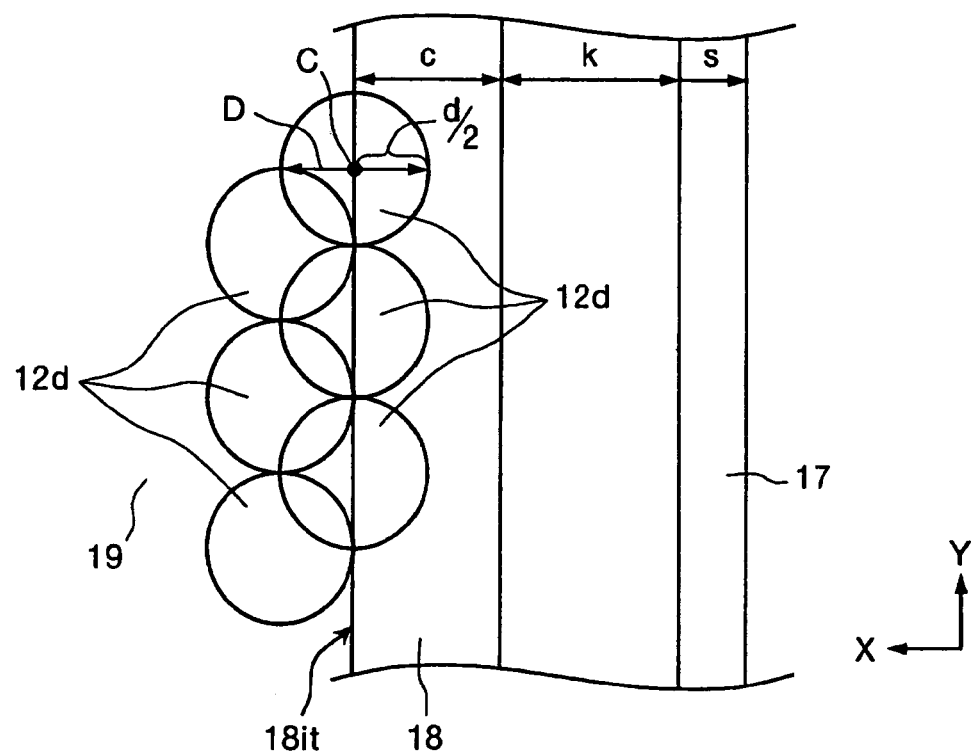

[FIG. 11]
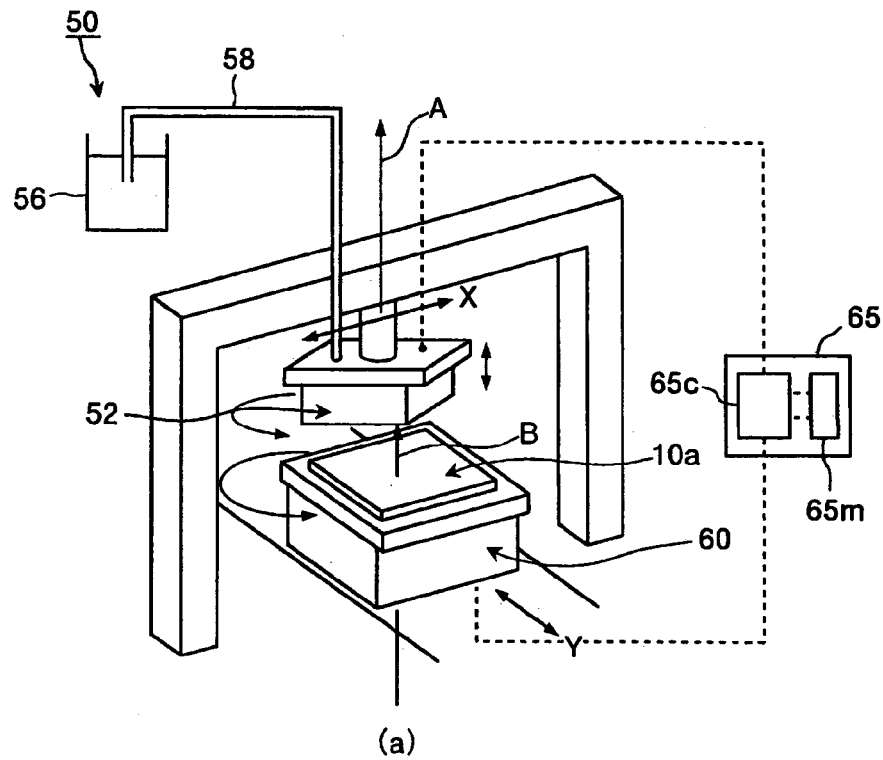
(a)
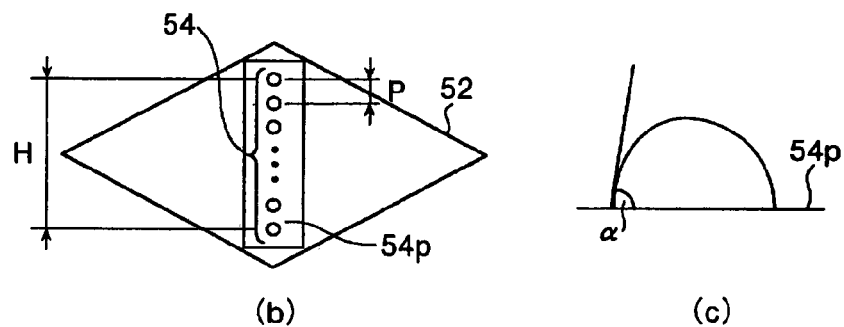
(b)  (c)
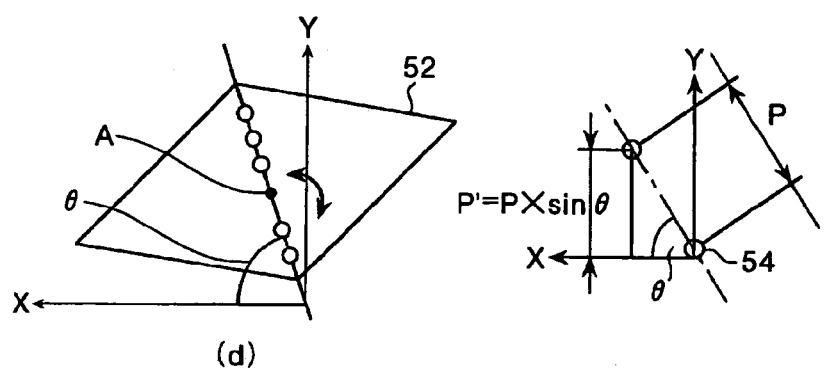
(d)

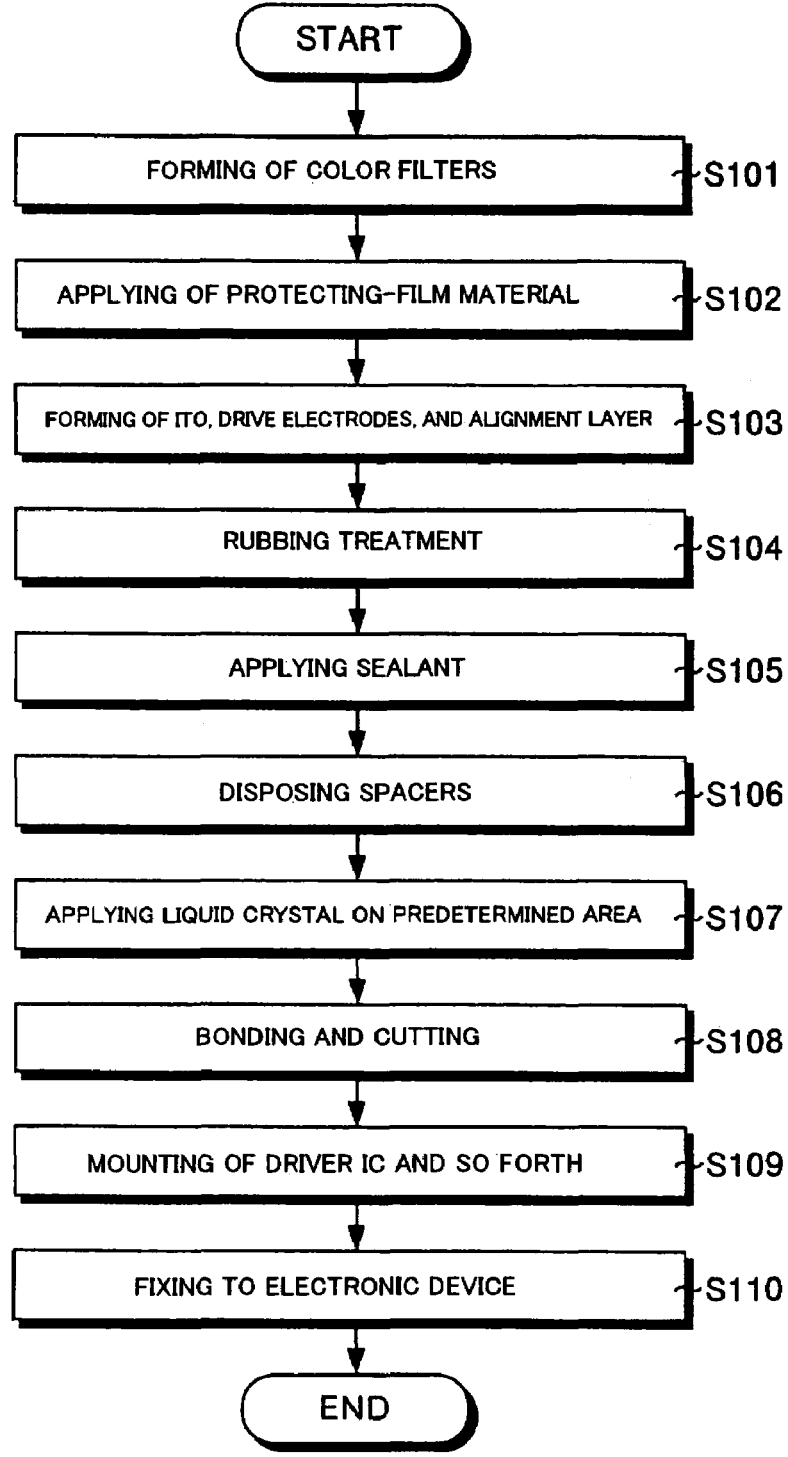
[FIG. 12]

[FIG. 13a]
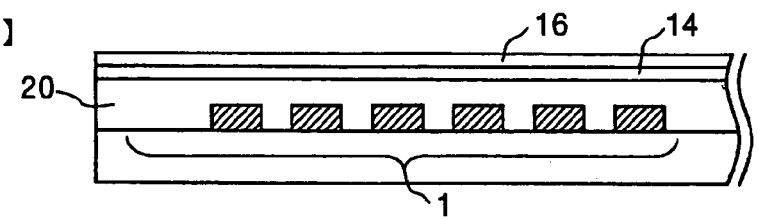
[FIG. 13b]
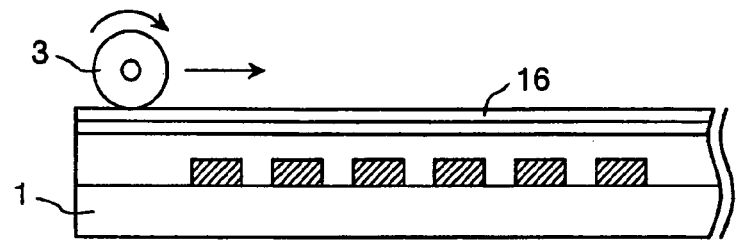
[FIG. 13c]
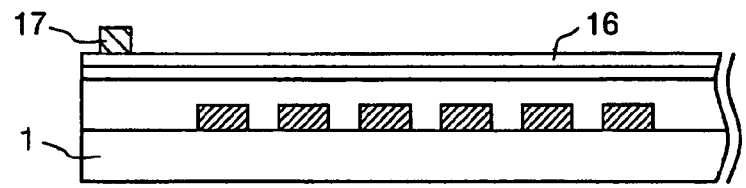
[FIG. 13d]
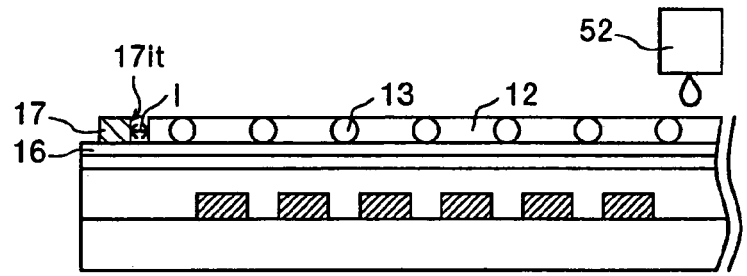
[FIG. 13e]
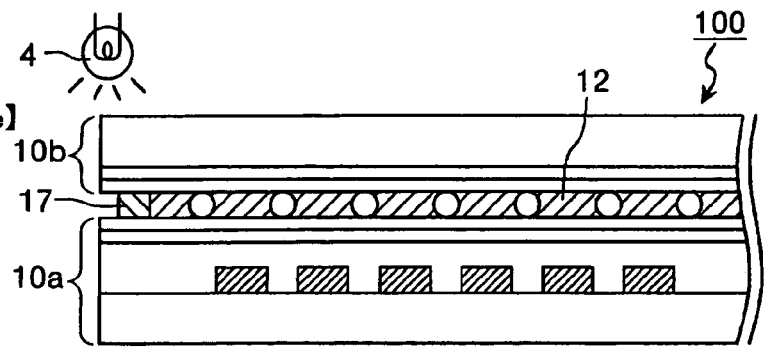

[FIG. 14a]
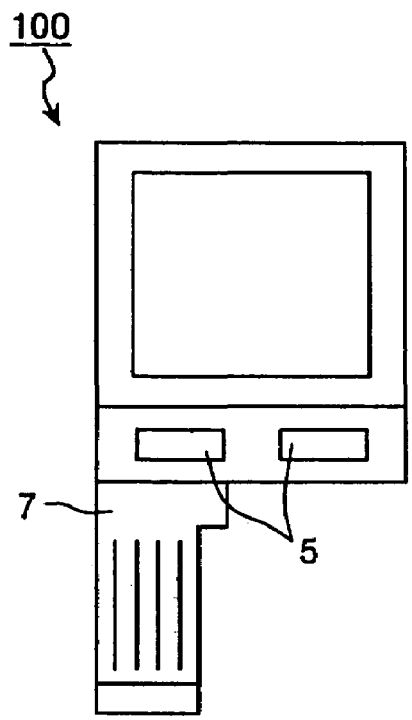
[FIG. 14b]
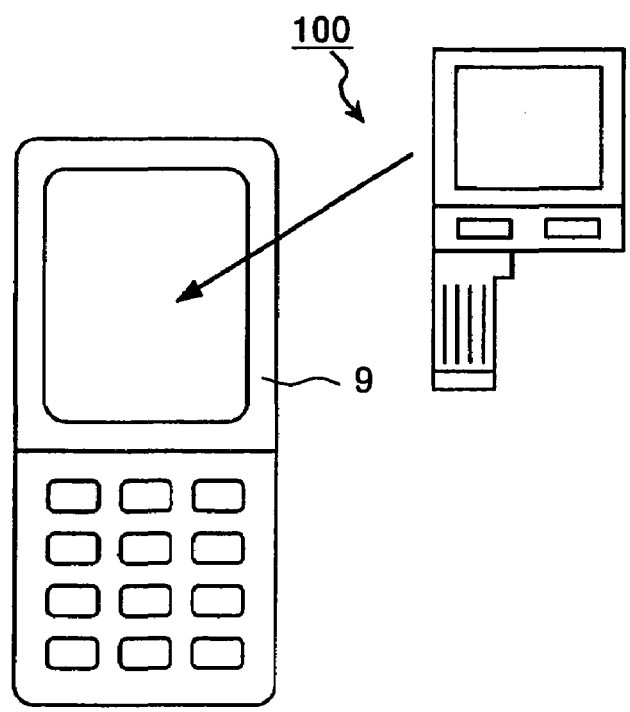

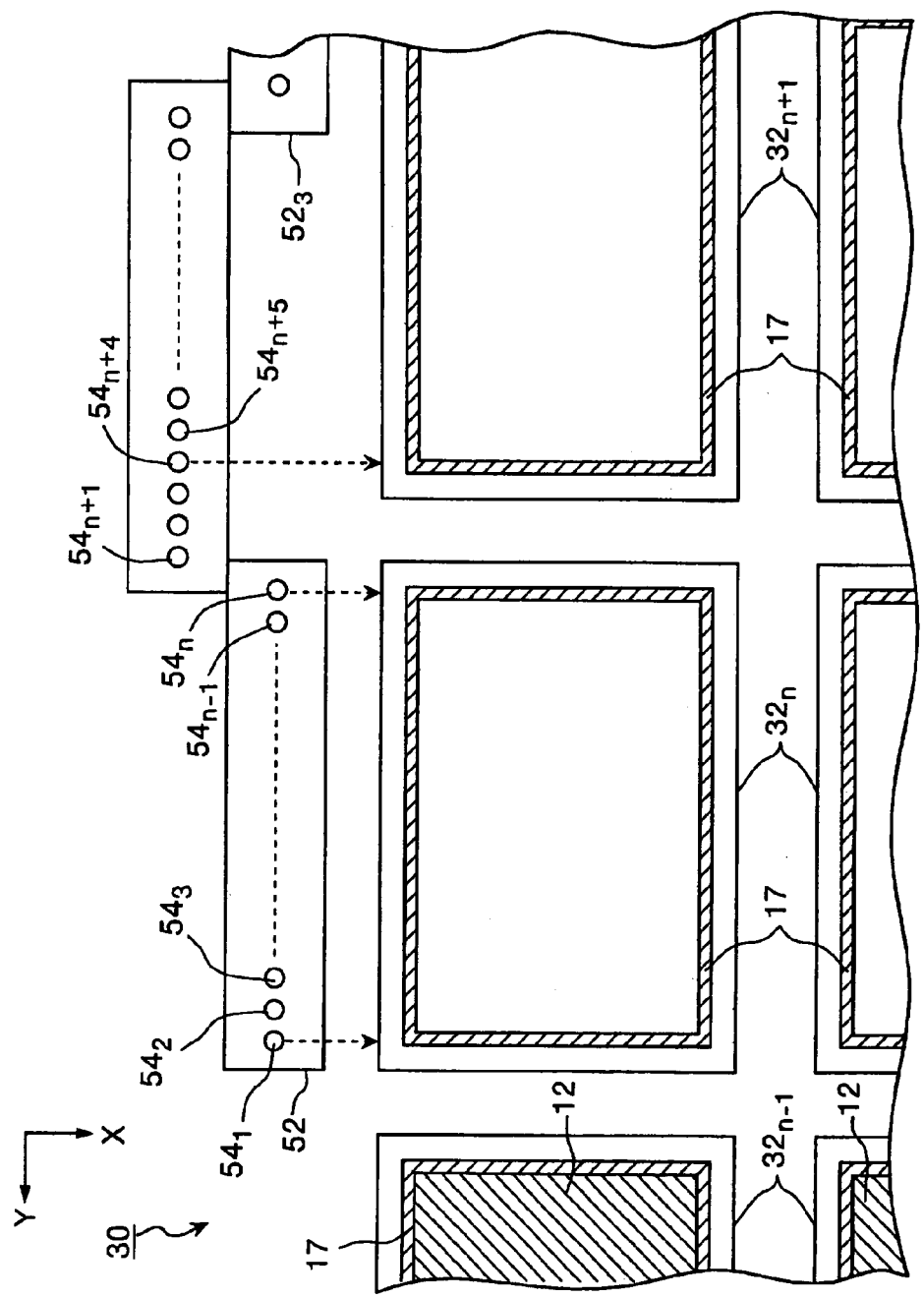
[FIG. 15]

METHOD, PROGRAM, AND APPARATUS FOR MANUFACTURING ELECTROOPTICAL PANEL, AND METHOD FOR MANUFACTURING ELECTRONIC DEVICE

RELATED APPLICATION

This application claims priority to Japanese Patent Application No. 2003-144501 filed May 22, 2003 which is hereby expressly incorporated by reference herein in its entirety.

BACKGROUND

1. Technical Field of the Invention

The present invention relates to an electrooptical panel, and more specifically, it relates to a method, a program, and an apparatus for manufacturing an electrooptical panel, which prevent liquid crystal from coming into contact with a sealant when the liquid crystal is applied with a droplet-discharging method so as to achieve high quality of the electrooptical panel, and further relates to a method for manufacturing an electronic device.

2. Description of the Related Art

An electrooptical panel is formed by an element substrate having driver elements formed thereon for driving corresponding pixels, a counter substrate disposed so as to face the element substrate, and liquid crystal hermetically filled between the two substrates. In order to hermetically fill the liquid crystal between the two substrates, the two substrates are bonded to each other, and then the space between the two substrates is evacuated so as to draw-in the liquid crystal. With this method, since the bonded substrates are dipped in a liquid crystal tank so as to draw-in liquid crystal into the space therebetween, an enormous amount of liquid crystal is needed. Also, since the liquid crystal in the liquid crystal tank deteriorates over time, the quality of an electrooptical panel sometimes differs between before and after the liquid crystal in the liquid crystal tank is replaced.

In order to solve the above problem, Japanese Unexamined Patent Application Publication No. 10-123537, P2, FIG. 1 has disclosed a method for hermetically filling liquid crystal, with which the sealant is applied on the element substrate, subsequently liquid crystal is dropped on the element substrate before the sealant is cured, and, immediately after that, the element substrate is bonded to the counter substrate. On this occasion, the sealant is doubly applied so that a layer of the sealant to be in contact with the liquid crystal is cured before the liquid crystal is applied, so as to prevent an uncured layer of the sealant from coming into contact with the liquid crystal.

Unfortunately, in the electrooptical panel having such a structure, when the dropped liquid crystal lies in contact with the cured sealant for a long time before the two substrates are bonded, the quality of the liquid crystal deteriorates. In view of the above problem, the present invention has been made. Accordingly, an object of the present invention is to provide a method, a program, and an apparatus for manufacturing an electrooptical panel, which prevent liquid crystal from coming into contact with a sealant when the liquid crystal is applied with a droplet-discharging method and thus prevent the liquid crystal from having deteriorated quality due to contact with the sealant, and further to provide a method for manufacturing an electronic device.

SUMMARY

In order to achieve the above object, a method for manufacturing an electrooptical panel according to the present invention includes the step of dropping a liquid-crystal droplet, upon applying liquid crystal on a display area of a substrate included in the electrooptical panel with a droplet-discharging method, so as to lie away from the edge, close to the display area, of a sealant applied on the outer circumference of the substrate farther than half the eventual spread diameter of the liquid-crystal droplet.

Also, a program for manufacturing an electrooptical panel according to the present invention enables a computer to achieve a process for dropping a liquid-crystal droplet, upon applying liquid crystal on a display area of a substrate included in the electrooptical panel with a droplet-discharging method, so as to lie away from the edge, close to the display area, of a sealant applied on the outer circumference of the substrate farther than half the eventual spread diameter of the liquid-crystal droplet.

The method for manufacturing an electrooptical panel includes the step of dropping a liquid-crystal droplet so as to lie away from the edge close to the display area (the inner edge) of the sealant farther than half the eventual spread diameter of the liquid-crystal droplet. Thus, the liquid-crystal droplet does not spread farther than the above limit in a wet state, thereby preventing it from coming into contact with the sealant, and preventing the quality of the liquid crystal from deterioration. As a result, a high-quality electrooptical panel with extremely-rare defective display can be manufactured. Also, the incidence of defective products can be reduced, thereby improving a production yield. In addition, since no liquid-crystal drawing-in port exists, the step for washing the port is not needed, thereby reducing a manufacturing time of the electrooptical panel by that much, and also eliminating a washing liquid.

Also, the program for manufacturing an electrooptical panel according to the present invention enables a computer to carry out the method for manufacturing an electrooptical panel. Meanwhile, a computer stated in the present invention is a so-called personal computer, a workstation, a personal digital assistant (PDA), a hardware formed by a central processing unit (CPU), a memory, and another electronic element, or the like (the same applies to the following descriptions).

Also, another method for manufacturing an electrooptical panel according to the present invention includes the step of applying a sealant for sealing liquid crystal on a substrate included in the electrooptical panel, upon applying liquid crystal on a display area of the substrate with a droplet-discharging method, such that the edge of the sealant close to the display area lies away from the drop center of the liquid-crystal droplet applied on the outermost circumference of the display area of the substrate farther than half the eventual spread diameter of the liquid-crystal droplet.

Also, a program for manufacturing an electrooptical panel according to the present invention enables a computer to achieve a process for applying a sealant for sealing liquid crystal on a substrate included in the electrooptical panel, upon applying the liquid crystal on a display area of the substrate with a droplet-discharging method, such that the edge of the sealant close to the display area lies away from the drop center of the liquid-crystal droplet applied on the outermost circumference of the display area of the substrate farther than half the eventual spread diameter of the liquid-crystal droplet.

The method for manufacturing an electrooptical panel includes the step of applying the sealant such that the edge close to the display area (the inner edge) of the sealant lies away from the drop center of the liquid-crystal droplet applied on the outermost circumference of the display area of the substrate farther than half the eventual spread diameter of the liquid-crystal droplet. Thus, the liquid-crystal droplet does not spread farther than the above limit in a wet state, thereby preventing the sealant and the liquid crystal from coming into contact with each other, and preventing the quality of the liquid crystal from deterioration.

As a result, a high-quality electrooptical panel with extremely-rare defective display can be manufactured. Also, the incidence of defective products can be reduced, thereby improving a production yield. In addition, since no liquid-crystal drawing-in port exists, the step for washing the port is not needed, thereby reducing a manufacturing time of an electrooptical panel by that much and also eliminating a washing liquid. Also, in accordance with the program for manufacturing an electrooptical panel according to the present invention, a computer carries out the method for manufacturing an electrooptical panel.

In the method for manufacturing an electrooptical panel according to present invention, the eventual spread diameter of the liquid-crystal droplet is given after a lapse of 30 minutes after the liquid-crystal droplet accretes onto an alignment layer.

When the liquid-crystal droplet accretes onto the alignment layer, the liquid-crystal droplet spreads in a wet state. The liquid-crystal droplet stops spreading on the alignment layer after a lapse of 30 minutes after the liquid-crystal droplet accretes onto the alignment layer. Accordingly, when the diameter of the liquid-crystal droplet in this state is defined as the eventual diameter of the liquid-crystal droplet, the liquid-crystal droplet is reliably prevented from coming into contact with the sealant and thus preventing the quality of the liquid crystal from deteriorating.

Also, in the method for manufacturing an electrooptical panel according to the present invention, the diameter of the liquid-crystal droplet extends parallel to a rubbing direction.

In order to align liquid crystal molecules in one direction, the alignment layer is subjected to a rubbing treatment. The diameter of the liquid-crystal droplet extending parallel to a direction along which the rubbing treatment is performed becomes greater than that of the liquid-crystal droplet extending perpendicular to the rubbing direction. Accordingly, when the eventual wet-spread diameter of the liquid-crystal droplet is defined as the diameter of the liquid-crystal droplet extending parallel to the rubbing direction, the liquid-crystal droplet is more reliably prevented from coming into contact with the sealant, and the quality of the liquid crystal is prevented from deterioration.

Also, an apparatus for manufacturing an electrooptical panel according to the present invention includes a stage on which a substrate included in the electrooptical panel is placed; a droplet-discharging head including a plurality of nozzles, each for discharging a liquid-crystal droplet onto the substrate, disposed at a predetermined pitch; and a controller for dropping the liquid-crystal droplet so as to lie away from the edge, close to the display area, of a sealant for sealing the liquid crystal, applied on the outer circumference of the substrate farther than half the eventual spread diameter of the liquid-crystal droplet.

With the apparatus for manufacturing an electrooptical panel, a liquid-crystal droplet is dropped by the droplet-discharging head so as to lie away from the edge close to the display area (the inner edge) of the sealant farther than half the eventual spread diameter of the liquid-crystal droplet. Thus, the liquid-crystal droplet does not spread farther than the above limit in a wet state, thereby preventing it from coming into contact with the sealant, and preventing the quality of the liquid crystal from deterioration. As a result, a high-quality electrooptical panel with extremely-rare defective display can be manufactured. Also, the incidence of defective products can be reduced, thereby improving a production yield. In addition, since no liquid-crystal drawing-in port exists, the step for washing the port is not needed, thereby reducing a manufacturing time of the electrooptical panel by that much, and also eliminating a washing liquid.

Also, in the apparatus for manufacturing an electrooptical panel according to the present invention, no liquid-crystal droplet is discharged from at least one of the nozzles facing at least one side of the sealant extending parallel to the drawing direction of the droplet-discharging head.

In the apparatus for manufacturing an electrooptical panel, no liquid-crystal droplet is discharged from the nozzles facing one side of the sealant applied so as to extend parallel to the drawing direction of the droplet-discharging head, thereby reliably preventing the sealant and the liquid crystal from coming into contact with each other and preventing the quality of the liquid crystal from deterioration.

Also, a method for manufacturing an electronic device according to the present invention includes the step of mounting an electrooptical panel manufactured with the above-mentioned method for manufacturing an electrooptical panel.

Since the method for manufacturing an electronic device includes the step of mounting an electrooptical panel manufactured with the method for manufacturing an electrooptical panel, a high-quality electronic device with extremely-rare defective display can be manufactured. Also, the incidence of defective products can be reduced, thereby improving a production yield. In addition, the step of washing the liquid-crystal drawing-in port is not needed, thereby reducing a manufacturing time of the electronic device by that much and eliminating a washing liquid.

BRIEF DESCRIPTION OF THE DRAWINGS

FIG. 1 is a partial sectional view illustrating the schematic structure of a liquid crystal panel as a kind of an electrooptical panel.

FIG. 2 is a plan view of a color-filter substrate according to a first embodiment, in a state of having no liquid crystal applied thereon.

FIG. 3 is a partial sectional view of the color-filter substrate according to the first embodiment, in a state of having liquid crystal applied thereon.

FIGS. 4a–d illustrate the spreading of a liquid-crystal droplet applied on an alignment layer.

FIG. 5 illustrates the relationship between a lapse of time and the diameter of the droplet shown in FIG. 4.

FIG. 6 illustrates the geometrical relationship between an application position of the liquid-crystal droplet and the sealant.

FIG. 7 illustrates the other geometrical relationship between an application position of the liquid-crystal droplet and the sealant.

FIGS. 8a and b illustrate the relationship between a rubbing direction and a liquid-crystal droplet.

FIG. 9 illustrates an example of the geometrical relationships between application positions of the liquid crystal droplets and a light-shielding area.

FIG. 10 illustrates another example of the geometrical relationships between application positions of the liquid crystal droplets and the light-shielding area.

FIGS. 11a–d illustrate an apparatus for manufacturing an electrooptical panel according to the present invention.

FIG. 12 is a flowchart illustrating methods for manufacturing an electrooptical panel and an electronic device according to the present invention.

FIGS. 13a–e illustrate the method for manufacturing an electrooptical panel according to the present invention.

FIGS. 14a–b illustrate the method for manufacturing an electronic device according to the present invention.

FIG. 15 illustrates an example method for applying liquid crystal with the apparatus for manufacturing an electrooptical panel.

DETAILED DESCRIPTION

Embodiments of the present invention will be described in detail with reference to the drawings. The embodiments do not limit the scope of the present invention. Also, some components in the following embodiments include those which a person skilled in the art will easily imagine or be substantially the same as those known by a person skilled in the art. In the following descriptions, a liquid crystal panel is used as an electrooptical panel by way of example.

First Embodiment

FIG. 1 is a partial sectional view of the schematic structure of a liquid crystal panel as a kind of an electrooptical panel 100. The electrooptical panel 100 is formed on a color-filter substrate 10a having the color filters 11 formed thereon, by applying liquid crystal 12 with a droplet-discharging method. As shown in FIG. 1, the electrooptical panel 100 is formed by the color-filter substrate 10a having the color filters 11 formed on the surface of a base plate 1 and a counter substrate 10b disposed so as to face the color-filter substrate 10a. The liquid crystal 12 is hermetically filled between the two substrates with a sealant 17 applied in the vicinity of the outer circumferential edges of the substrates. The color-filter substrate 10a and the counter substrate 10b have spacers 13 interposed therebetween so as to maintain the gap t between the two substrates at a substantially constant value across the entire surfaces thereof.

FIG. 2 is a plan view of the color-filter substrate 10a according to a first embodiment, in a state of having no liquid crystal applied thereon. As shown in FIG. 2, the color-filter substrate 10a has the sealant 17 applied on the outer circumference thereof. Also, the color-filter substrate 10a has a light-shielding area 18 formed inside the sealant 17, having a certain spacing from the inner edge of the sealant 17, so as to prevent light of a backlight from entering from outside the light-shielding area 18 and has a display area 19 formed inside the light-shielding area 18, in which an image is actually displayed.

FIG. 3 is a partial sectional view of the color-filter substrate 10a according to the first embodiment, in a state of having liquid crystal applied thereon. In the color-filter substrate 10a, the liquid crystal 12 is applied on the display area 19 with a droplet-discharging method such as an inkjet method or a plunger method, and then two substrates are sealed. Although, in the descriptions of the following embodiments, the liquid crystal 12 is applied on the color-filter substrate 10a before the two substrates are sealed by way of example, alternatively, the liquid crystal 12 may be applied on the counter substrate 10b, and then the sealant 17 is applied on the same before the two substrates are sealed.

As shown in FIG. 3, in order to prevent the liquid crystal 12 and the sealant 17 from coming into contact with each other during a time period after the liquid crystal 12 is applied and before the two substrates are sealed, the liquid crystal 12 is applied on the display area 19 having a predetermined spacing k disposed from the edge of the sealant 17 close to the display area 19. The color-filter substrate 10a has a color-filter protecting film 20 formed therein, composed of a transparent material so as to protect the color filters 11 formed on the base plate 1. The color-filter protecting film 20 has an indium tin oxide (ITO) 14 and an alignment layer 16 composed of polyimide or the like, formed thereon in that order. The color-filter protecting film 20 has functions for protecting the color filters 11 from heat generated when the ITO 14 is formed and for planarizing irregularities among the color filters 11 so as to prevent short-circuiting of the ITO 14 and an insufficient rubbing treatment of the alignment layer 16.

FIG. 4 illustrates spreading of a liquid-crystal droplet 12d when applied on the alignment layer 16. Since an alignment layer for use in an electrooptical panel is generally composed of a polyimide resin, when the liquid-crystal droplet 12d accretes onto the alignment layer 16, the droplet 12d gradually spreads over time on the alignment layer 16 in a wet state, as shown in FIGS. 4(a) to 4(d). FIG. 4(a) illustrates a state of the liquid-crystal droplet 12d immediately after it accretes onto the alignment layer 16, and then, in the order of FIG. 4(b) to 4(d), the liquid-crystal droplet 12d spreads further over time on the alignment layer 16 in a wet state. The droplet 12d has a diameter $D_a$ immediately after the liquid-crystal droplet 12d accretes onto the alignment layer 16, and the diameter of the liquid-crystal droplet 12d becomes greater from $D_b$ to $D_\infty$ as shown in FIGS. 4(b) to 4(d), wherein reference character $D_\infty$ represents the diameter of the liquid-crystal droplet 12d after the lapse of a sufficient (determinable) time. Since the diameter of the liquid-crystal droplet 12d does not become any greater after a lapse of sufficient time, the diameter of the liquid-crystal droplet 12d at this time is represented by $D_{max}$ defining the largest wet-spread diameter of the liquid-crystal droplet 12d.

FIG. 5 illustrates the relationship between a lapse of time and a diameter of the droplet shown in FIG. 4, on the basis of the result of an experiment conducted such that an applied amount of the liquid-crystal droplet 12d was made greater in the order of the marks □, ○, and Δ, and the wet-spread diameter of the droplet 12d was measured in accordance with a lapse of time after the liquid-crystal droplet 12d accretes onto the alignment layer 16. The vertical axis indicates a value of the diameter D of the liquid-crystal droplet 12d divided by the largest wet-spread diameter $D_{max}$ of the same. Also, the original point of time is set when the liquid-crystal droplet 12d accretes onto the alignment layer 16. As is known from FIG. 5, regardless of an applied amount of the liquid-crystal droplet 12d, the diameter of the liquid-crystal droplet 12d becomes the largest wet-spread diameter $D_{max}$ after a lapse of 30 minutes after the liquid-crystal droplet 12d accretes onto the alignment layer 16. That is, it is found that the liquid-crystal droplet 12d does not spread any more regardless of an amount of the liquid-crystal droplet 12d when a period of 30 minutes or more passes after the liquid-crystal droplet 12d accretes onto the alignment layer 16.

With the above finding in mind, in order to prevent the sealant 17 and the liquid crystal 12 shown in FIGS. 2 and 3 from coming into contact with each other, the liquid-crystal droplet 12d should be applied on the alignment layer 16, taking the largest wet-spread diameter $D_{max}$ of the liquid-crystal droplet 12d into account. To be more specific, when the liquid-crystal droplet 12d is applied away from the edge-the sealant 17 close to the display area 19 by at least $D_{max}/2$, the liquid-crystal droplet 12d does not spread farther than the above distance, thereby preventing the liquid-crystal droplet 12d from accreting to the sealant 17.

Next, an application position of the liquid-crystal droplet 12d will be described.

FIGS. 6 and 7 illustrate the geometrical relationships between an application position of each liquid-crystal droplet 12d and the sealant 17 by magnifying the area E shown in FIG. 2, wherein FIG. 6 illustrates a case where the spacing I between the drop center C of the liquid-crystal droplet 12d and the inner edge 17it of the sealant 17 (the edge of the sealant 17 close to the display area 19) is greater than half the largest wet-spread diameter $D_{max}$ of the liquid-crystal droplet 12d, and the liquid-crystal droplet 12d does not come into contact with the sealant 17, while FIG. 7 illustrates a case where the spacing I between the drop center C of the liquid-crystal droplet 12d and the inner edge 17it of the sealant 17 (the edge of the sealant 17 close to the display area 19) is equal to half the largest wet-spread diameter $D_{max}$ of the liquid-crystal droplet 12d, and the liquid-crystal droplet 12d sometimes comes into contact with the sealant 17. Hence, in order to prevent the liquid-crystal droplet 12d from coming into contact with the sealant 17, the condition: the spacing $I>D_{max}/2$ must be satisfied. In reality, it is sufficient that the liquid crystal 12 is applied so as to satisfy the above-mentioned condition between the sealant 17 and the liquid-crystal droplet 12d, and the order of applying the sealant 17 and the liquid crystal 12 is not essential (the same applies to the following descriptions).

FIG. 8 illustrates the relationship between a rubbing direction and a liquid-crystal droplet 12d'. In a process for manufacturing an electrooptical panel, the rubbing treatment is applied on the alignment layer 16 (see FIG. 3) in order to align the liquid crystal molecules of the liquid crystal 12 in one direction. As shown in FIG. 8(a), with the rubbing treatment, a rubbing roller 3 having a piece of rubbing cloth or the like wound therearound is moved, in a predetermined direction while being rotated, on the alignment layer 16 formed on the color-filter substrate 10a or the like so as to form fine grooves on the alignment layer 16 in the moving direction of the rubbing roller 3 (the rubbing direction, i.e., the X-direction shown in FIG. 8(a)). When the liquid crystal 12 is applied on the alignment layer 16, the liquid-crystal-molecules of the liquid crystal 12 enter these grooves and are thus aligned in one direction.

When the liquid-crystal droplet 12d' is applied on the alignment layer 16 subjected to the rubbing treatment, as shown in FIG. 8(b), which is a magnified illustration of the area E shown in FIG. 8(a), the liquid-crystal droplet 12d' is stretched in the rubbing direction so as to have an elliptical shape. The stretched degree of the liquid-crystal droplet 12d' depends on the conditions such as the properties of the alignment layer 16, the viscosity of the liquid-crystal droplet when it is applied, and so forth. When the stretched degree is so large, it cannot be ignored and must be taken into account. When the liquid-crystal droplet 12d' is stretched in the rubbing direction, it has an elliptical shape with a long diameter (a diameter extending along the rubbing direction) $D_1$ and a short diameter $D_2$. In order to prevent the liquid-crystal droplet 12d' and the sealant 17 from coming contact with each other, it is sufficient that the edge of the liquid-crystal droplet 12d' lying along the long diameter $D_1$ does not come into contact with the sealant 17. Accordingly, when the largest wet-spread diameters of the liquid-crystal droplet 12d' are defined by $D_{1max}$ and $D_{2max}$, the liquid-crystal droplet 12d' and the sealant 17 do not come into contact with each other as long as the condition: the spacing $I>D_{1max}/2$ is satisfied.

As described above, even when the liquid-crystal droplet 12d' is stretched in the rubbing direction, by making the spacing I greater than half the largest wet-spread diameter extending along the rubbing direction, that is, half the longer diameter of the liquid-crystal droplet 12d', the liquid-crystal droplet 12d' and the sealant 17 are reliably prevented from coming into contact with each other, thereby preventing the quality of the liquid crystal 12 from deterioration.

FIG. 9 illustrates an example of the geometrical relationships between application positions of the droplets 12d and the light-shielding area 18. When the liquid-crystal droplet 12d is applied closer to the display area 19 than the light-shielding area 18, sometimes the liquid crystal 12 is not applied so as to extend to the edge of the light-shielding area 18. On such an occasion, when the light-shielding area 18 and the display area 19 include an area therebetween having no liquid crystal 12 applied thereon, light leaks through the area and causes defective display. To prevent this problem, the liquid crystal 12 must be fully applied on the area between the light-shielding area 18 and the display area 19.

As shown in FIG. 9, when the liquid-crystal droplets 12d are applied such that the spacing between the two diagonally adjacent liquid-crystal droplets 12d is equal to the diameter D of the liquid-crystal droplet 12d, all the liquid-crystal droplets 12d are applied with no space among them. In this state, the spacing between the two adjacent liquid-crystal droplets 12d in the X or Y direction is equal to $\sqrt{2} \times D/2$, which provides the largest spacing between the two adjacent liquid-crystal droplets 12d in the X or Y direction so as to apply all the liquid-crystal droplets 12d with no space among them. In the case where the liquid-crystal droplets 12d are applied as mentioned above, when the spacing f between the drop center C of the liquid-crystal droplet 12d and the inner edge 18it of the light-shielding area 18 (the edge of the light-shielding area 18 close to the display area 19) is equal to (D/2−h), that is, $(D/2-\sqrt{2} \times D/4)$, the liquid crystals 12 are fully applied on the area between the light-shielding area 18 and the display area 19.

Accordingly, when the condition about the above-mentioned largest spacing with which all the liquid-crystal droplets 12d are applied with no space is satisfied, in order to fully apply the liquid crystal 12 on the area between the light-shielding area 18 and the display area 19, the condition: the spacing $f<(D/2-\sqrt{2} \times D/4)$ must be satisfied.

FIG. 10 illustrates another example of the geometrical relationships between application positions of the liquid-crystal droplets 12d and the light-shielding areas 18. In this example, the drop centers C of some of the liquid-crystal droplets 12d and the inner edge 18it of the light-shielding area 18 have no spacing therebetween. In this case, although the condition: the spacing $f<(D/2-\sqrt{2} \times D/4)$ is not satisfied, when the liquid-crystal droplets 12d are applied in a zigzag pattern as shown in FIG. 10, the liquid-crystal droplets 12d in the display area 19 can be applied with no space. Next, an apparatus for manufacturing an electrooptical panel according to the present invention will be described.

FIG. 11 illustrates an apparatus 50 for manufacturing an electrooptical panel according to the present invention. In the present invention, liquid crystal is applied by droplet-discharging, and, in the present embodiment, inkjet droplet-discharging is used as the droplet-discharging. The apparatus 50 for manufacturing an electrooptical panel includes a droplet-discharging head 52 and a stage 60. Liquid crystal is fed to the droplet-discharging head 52 serving as droplet-discharging means from a tank 56 through a feeding tube 58.

As shown in FIG. 11(*b*), the droplet-discharging head 52 has a plurality of nozzles 54 arranged at a given pitch P within the arranging width H thereof. Each nozzle 54 includes a piezoelectric element (not shown), and any one of the nozzles 54 discharges a liquid-crystal droplet in accordance with a command from a processing unit 65*c* included in a controller 65. The controller 65 also includes a memory unit 65*m* storing a pattern for applying the liquid-crystal droplet 12*d*, a program for controlling the droplet-discharging head 52 and the stage 60, and so forth. Also, by changing a drive pulse of the piezoelectric element, an amount of the liquid crystal to be discharged from the corresponding nozzle 54 can be changed. Instead of the controller 65, a personal computer or a workstation can be used.

The droplet-discharging head 52 is rotatable about the rotating axis A extending vertically through the center thereof. As shown in FIG. 11(*d*), when the droplet-discharging head 52 is rotated about the rotating axis A so as to make an angle θ between the arranging direction of the nozzles 54 and the X direction, an apparent pitch P' of the nozzles 54 can be made P'=P×sin θ. With this arrangement, the pitch of the nozzles 54 can be changed in accordance with an application area of the color-filter substrate 10*a*, properties of the liquid crystal, and other application conditions.

The color-filter substrate 10*a* serving as an object on which the liquid crystal is applied is placed on the stage 60. The stage 60 is moveable in the Y direction (the sub-scanning direction) and is also rotatable about the rotating axis B extending vertically through the center thereof.

The droplet-discharging head 52 discharges the liquid crystal droplets onto the color-filter substrate 10*a* within the arranging width H of the nozzles 54 while reciprocating in the X direction (the main scanning direction) indicated in the figure. Upon finishing one scanning operation for applying the liquid crystal, the stage 60 moves in the Y direction by the arranging width H of the nozzles 54, and the droplet-discharging head 52 discharges the liquid crystal onto the following area. If the liquid-crystal application area of the color-filter substrate 10*a* has a width smaller than the arranging width H of the nozzles 54, it is preferable that the liquid crystal be applied on the entire liquid-crystal application area during one scanning operation of the droplet-discharging head 52. With this arrangement, the liquid crystal can be applied on the entire liquid-crystal application area without a linefeed, thereby reducing unevenness in display.

An operation of the droplet-discharging head 52, a discharging operation of each nozzle 54, and an operation of the stage 60 are controlled by the controller 65. When operation patterns of these components are previously programmed, an application pattern can be easily changed in accordance with the application area of the color-filter substrate 10*a*, properties of the liquid crystal, and other application conditions. By repeating the above operations, the liquid crystal can be applied on the entire area of the color-filter substrate 10*a*. Likewise, it is also possible that the droplet-discharging head 52 discharges the liquid crystal while the stage 60 is moving in the Y direction, is then moved in the X direction by the arranging width H, and discharges the liquid crystal on the subsequent area.

During the droplet-discharging process, it is desirable to stably discharge a liquid-crystal droplet from each nozzle 54. To meet the above requirement, the liquid crystal according to the present invention is prepared so as to have properties appropriate for the droplet-discharging. To be specific, the viscosity and the surface tension of the liquid crystal are respectively in the ranges from 1 to 20 mPa·s and from 20 to 70 mN/m. In order to prepare the liquid crystal having the viscosity and the surface tension in the respective ranges, the liquid crystal is fed to the droplet-discharging head 52 after its temperature is increased to about 50 to about 70° C.

Within the above-mentioned ranges, the liquid crystal can be stably fed to each nozzle 54 and has a stable meniscus at the outlet of the nozzle 54. With this arrangement, a liquid-crystal droplet can be stably discharged from the nozzle 54, thereby manufacturing a high-quality electrooptical panel in which unevenness in display is significantly reduced. Also, within the above-mentioned ranges of the viscosity and the surface tension, an amount of energy needed for discharging a liquid-crystal droplet is not more than expected and is not accordingly beyond the discharging capability of the piezoelectric element. The temperature of the liquid crystal can be increased by disposing heating means to, for example, the tank 56, the feeding tube 58, or the droplet-discharging head 52.

The viscosity and the surface tension are more preferably in the ranges from 4 to 8 mPa·s and from 25 to 35 mN/m, respectively. Within these ranges, the liquid crystal can be more stably fed to each nozzle 54 and also has a more stable meniscus at the outlet of the nozzle 54.

With this arrangement, a liquid-crystal droplet is more stably discharged from each nozzle 54, thereby manufacturing a high-quality electrooptical panel.

In addition, the contact angle α (see FIGS. 11(*b*) and 11(*c*)) made by the liquid crystal and a nozzle plate 54P as a plate-like member is preferably in the range from 30 to 170 degrees. When the contact angle α made by the liquid crystal and the nozzle plate 54*p* is too small, the liquid crystal is attracted toward the nozzle plate 54*p* when being discharged from each nozzle 54. As a result, the position on the color-filter substrate 10*a*, to which a liquid-crystal droplet accretes, is shifted, thereby causing a risk that the liquid-crystal droplet may accrete to the sealant 17. With the contact angle α in the above-mentioned range, the liquid crystal is not attracted toward the nozzle plate 54*p*, and a liquid-crystal droplet accretes to a predetermined position on the color-filter substrate 10*a*. In order to more stably accrete the liquid-crystal droplet to the predetermined position, the contact angle α is more preferably not lower than 50 degrees and is most preferably not lower than 80 degrees.

In order to make the contact angle α made by the liquid crystal and the nozzle plate 54*p* lie in one of the above-mentioned ranges, for example, the nozzle plate 54*p* undergoes a liquid-repellent treatment. The liquid-repellent treatment is achieved by coating a liquid-repellent material on the nozzle plate 54*p*. The example liquid-repellent material is a silane coupling agent containing fluorine. Liquid repellence means that the nozzle plate 54*p* repels the liquid crystal, and the liquid-repellent treatment is conducted so as to deteriorate wet-properties of the nozzle pate 54*p* and the liquid crystal.

Next, a method for manufacturing an electrooptical panel and a method for manufacturing an electronic device, including the method for manufacturing an electrooptical panel, both according to the present invention, will be described.

FIG. 12 is a flowchart illustrating methods for manufacturing an electrooptical panel and an electronic device. FIGS. 13 and 14 illustrate the methods for manufacturing an electrooptical panel and for manufacturing an electronic device, respectively, according to the present invention. First of all, as shown in FIG. 13(a), the color filters 11 are formed on the base plate 1 by photolithography or with a droplet-discharging method such as an inkjet method or a plunger method (in Step S101).

Next, the color-filter protecting film 20 is formed on the color filters 11 (in Step S102). The color-filter protecting film 20 is formed such that a liquid protecting-film material is applied on the color filters 11 with a droplet-discharging method such as an inkjet method or a spin coat method. The protecting-film material contains at least one of an acrylic resin, an epoxy resin, an imide resin, and a fluorocarbon resin, and said at least one of the resins is dissolved in solvent such as glycerin, diethylene glycol, methanol, or ethanol. When the solvent in the protecting-film material evaporates, the resin becomes the color-filter protecting film 20.

From the perspectives of a reducing an amount of the protecting-film material and forming the uniform color-filter protecting film 20 regardless of irregularities of the color filters 11, it is preferable to use the droplet-discharging method. When the droplet-discharging method is used, in order to improve the wet property of the color filters 11 in association with that of the liquid protecting-film material to be applied on the color filters 11, it is preferable that a surface-modifying treatment be applied on the color filters 11. When the wet property is unsatisfactory, since the protecting-film material is likely to form a droplet, the protecting-film material is not uniformly applied on the color filters 11. Also, the protecting-film material is unlikely to interpenetrate among the color filters 11, and a bubble is sometimes generated in a space where no protecting-film material exists, thereby causing a risk of deteriorating the quality of a display image of the electrooptical panel 100. As the surface-modifying treatment, for example, ultraviolet irradiation with an ultraviolet (UV) lamp or an oxygen-plasma treatment can be employed. Especially, it is preferable to use the oxygen-plasma treatment, since a residue on the color filters 11 can be removed and the quality of the color-filter protecting film 20 is accordingly improved.

When the color-filter protecting film 20 is formed on the color-filter substrate 10a, the ITO 14 and the alignment layer 16 are formed on the protecting film 20 as shown in FIG. 13(a) (in Step S103). Also, drive electrodes are formed on the counter substrate 10b shown in FIG. 1 (in Step S104). The ITO 14 and the drive electrodes are formed by sputtering or the like, and the alignment layer 16 is formed by a droplet-discharging method or a spin coat method. When the alignment layer 16 is formed, the alignment layer 16 is subjected to a rubbing treatment as shown in FIG. 13(b) (in Step S104). The rubbing treatment is conducted such that the rubbing roller 3 having a piece of rubbing cloth wound therearound is moved on the alignment layer 16 in a predetermined direction while being rotated.

When the rubbing treatment is finished, the sealant 17 is applied on a predetermined area on the alignment layer 16 as shown in FIG. 13(c) (in Step S105). The sealant 17 composed of a UV curable resin or a thermosetting resin hermetically seals the space between the color-filter substrate 10a and the counter substrate 10b by UV irradiation or heating, respectively. In the present embodiment, a UV curable resin is used as the sealant 17. The sealant 17 can be applied, for example, with a plunger method. Subsequently, the spacers 13 are disposed on the alignment layer 16. The spacers 13 may be simply scattered or alternatively disposed among the color filters 11 or lattices of a black matrix (not shown) with an inkjet method. When the spacers 13 are disposed among the color filters 11 or the like as mentioned above, the spacers 13 do not lay on pixels, thereby improving the display quality of the electrooptical panel 100.

When the spacers 13 are disposed, the liquid crystal 12 is applied on a predetermined area on the alignment layer 16 as shown in FIG. 13(d) (in Step S107). With the previously described apparatus 50 for manufacturing an electrooptical panel, the liquid crystal 12 is applied on the predetermined area so as to extend away from the inner edge 17it of the sealant 17 by the predetermined spacing I. This step is achieved by previously storing a liquid-crystal application pattern in which the predetermined spacing I extends from the inner edge 17it of the sealant 17, in the controller 65 of the apparatus 50 for manufacturing an electrooptical panel.

Although the sealant 17 and then the liquid crystal 12 are sequentially applied on the alignment layer 16 in the present embodiment, it is possible that the liquid crystal 12 is applied on the alignment layer 16, and the sealant 17 is subsequently applied on the alignment layer 16 so as to extend away from liquid-crystal droplet dropped on the outermost circumference of the alignment layer 16 by the predetermined spacing I. In such a state, the spacing between the drop center of the liquid-crystal droplet and the inner edge 17it of the sealant 17 is the same as the spacing I.

Then, the color-filter substrate 10a and the counter substrate 10b are bonded to each other (in Step S108), and the sealant 17 is cured with a UV lamp 4 as shown in FIG. 13(e)).

Upon being cured, if needed, the sealant 17 is cut per chip, for example (in Step S108) so as to complete the electrooptical panel 100. After then, as shown in FIG. 14(a), a harness, a flexible printed circuit (FPC) 7, and a driver IC 5 are mounted on the completed electrooptical panel 100 (in Step S109). Then, as shown in FIG. 14(b), the electrooptical panel 100 is fixed to an electronic device 9 such as a portable phone or a PDA so as to complete the electronic device 9 (in Step S110).

As described above, according to the present invention, since the liquid-crystal droplet 12d is dropped away from the inner edge of the sealant 17 farther than half the eventual wet-spread diameter of the liquid-crystal droplet 12d, thereby preventing the liquid-crystal droplet 12d from coming into contact with the sealant 17, and preventing the quality of the liquid crystal 12 from deterioration. As a result, a high-quality electrooptical panel with extremely-rarely defective display can be manufactured. Also, the incidence of defective products can be reduced, thereby improving a production yield.

Also, by dropping the liquid-crystal droplet 12d away from the sealant 17 farther than half the eventual wet-spread diameter thereof, even when a certain period of time is needed during a period of time after the liquid crystal 12 is applied and before the two substrates 10a and 10b are bonded to each other, the liquid-crystal droplet 12d is prevented from coming into contact with the sealant 17. With this arrangement, a sufficient period of time can be kept for aligning the substrates 10a and 10b with each other, thereby reducing occurrence of defective products, and improving a production yield. Also, even when the electrooptical panel 100 suffers from a disturbance such as vibration while it is transferred from the step for applying the liquid crystal 12 to the step for bonding the two substrates 10a and 10b, the liquid crystal 12 and the sealant 17 are prevented from coming into contact with each other, thereby preventing the quality of the liquid crystal from deterioration and reducing the occurrence of defective products.

With a known method of drawing-in liquid crystal, an excessive amount of accreted liquid crystal is washed out, thereby leading to an increased amount of consumption of liquid crystal. On the contrary, with the droplet-discharging method, liquid crystal can be applied with a prescribed application amount, thereby reducing excessive consumption of the liquid crystal. Hence, an amount of consumption of expensive liquid crystal can be reduced, thereby leading to a reduced cost of the electrooptical panel 100. Also, with the known method of drawing-in liquid crystal, unevenness due to a stream occurring when liquid crystal is drawn-in is displayed. On the contrary, with the droplet-discharging method, such unevenness does not occur, thereby improving the display quality of the electrooptical panel 100. In addition, with the droplet-discharging method, liquid crystal with a prescribed amount can be applied on the corresponding substrate, whereby an amount of liquid crystal to be used can be reduced in comparison to that used with the known method of drawing-in liquid crystal. Furthermore, since no liquid-crystal drawing-in port exists as is conventionally needed, the step for washing the port is eliminated, thereby reducing a manufacturing time of the electrooptical panel 100 by that much, and further eliminating a washing liquid.

Second Embodiment

FIG. 15 illustrates an example method for applying liquid crystal with the apparatus 50 for manufacturing an electrooptical panel. In a second embodiment, the way of applying liquid crystal with the apparatus 50 for manufacturing an electrooptical panel according to the present invention will be described. Since the structure of the apparatus 50 for manufacturing an electrooptical panel according to the second embodiment is substantially the same as that already described above, the description of the same structure will be omitted, and the same parts are identified by the same reference characters.

The long droplet-discharging head 52 according to the second embodiment is formed by connecting a plurality of droplet-discharging heads, each including an n number of nozzles, for example, $54_1$ to $54_n$ (n: natural number). With this structure, the liquid crystal 12 can be broadly applied with respect to the linefeed direction (the Y direction). With such a droplet-discharging head 52, the liquid crystal 12 is applied on a plurality of chip-substrate lines $32_n$ (n: natural number) formed on a large substrate 32 all at once. FIG. 15 illustrates a state in which the liquid crystal 12 is applied up to the chip-substrate line $32_{n-1}$. The droplet-discharging head 52 moves in the linefeed direction (the Y direction) and applies the liquid crystal 12 on from the chip-substrate lines $32_n$ to $32_{n+k}$ (k: natural number).

When the droplet-discharging head 52 applies the liquid crystal 12 on the chip-substrate line $32_{n-k}$, the nozzles $54_1$, $54_n$, $54_{n+4}$ and others facing the sides of the sealant 17 extending parallel to the drawing direction (X direction), do not discharge the liquid crystal 12, while the nozzles $54_2$ to $54_{n-1}$, $54_{n+5}$, and others are used to apply the liquid crystal 12. As described above, the liquid crystal 12 is not discharged from the nozzles facing the sides of the sealant 17 extending parallel to the drawing direction (the X direction), while the liquid crystal 12 is applied on the area of the alignment layer 16, having a predetermined spacing away from the inner edge of the sealant 17. By performing a drawing operation without discharging the liquid crystal 12 from the nozzles facing the sides of the sealant 17 extending parallel to the drawing direction (the X direction) as mentioned above, the liquid crystal 12 can be reliably applied on the area of the alignment layer 16, having a predetermined spacing away from the inner edge of the sealant 17.

The methods for manufacturing an electrooptical panel and an electronic device according to the first and second embodiments can be achieved by loading a previously prepared program into the processing unit 65c of the controller 65 and by executing the program. The program can be also distributed through a network such as Internet. Also, the program can be executed by storing it in a recording medium readable by a computer and by loading it into the processing unit 65c of the controller 65 via a predetermined interface. The recording medium readable by a computer means a portable medium such as a flexible disk (FD), a CD-ROM, an MO, or a DVD, or a storage such as a hard disk built in a computer system.

Applicable Objects of the Present Invention

Electronic devices to which the electrooptical panel according to the present invention is applicable include a portable information device called a personal digital assistant (PDA), a portable personal computer, a personal computer, a digital still camera, an automobile-use monitor, a digital video camera, a liquid-crystal TV, a viewfinder-type video recorder, a direct-view monitor type video tape recorder, an automobile-use navigation system, a pager, an electronic personal, organizer, an electronic calculator, a word processor, a workstation, a videophone, and a POS terminal other than a portable phone. Also, a person skilled in the art will appreciate that the present invention is also applicable even to electrical connecting structures of theses electronic devices.

The electrooptical panel is of a transmissive or reflective type, and an illumination unit (not shown) is used as a backlight. Meanwhile, the same applies to an active matrix color electrooptical panel. Although a passive matrix electrooptical panel is used in each of the above-described embodiments by way of example, the electrooptical panel according to the resent invention is likewise applicable to an active matrix electrooptical panel (for example, an electrooptical panel including a thin film transistor (TFT), or a thin film diode (TFD) as a switching device).

What is claimed is:

1. A method for manufacturing an electrooptical panel, comprising:
applying liquid crystal on a display area of a substrate included in the electrooptical panel, the applying step including dropping a liquid-crystal droplet away from a display area edge of a sealant applied on an outer circumference of the substrate by more than half of an eventual spread diameter of the liquid-crystal droplet.

2. The method of manufacturing an electrooptical panel according to claim 1, further comprising mounting the electrooptical.

3. A method for manufacturing an electrooptical panel, comprising:
applying a sealant for sealing liquid crystal on a substrate included in the electrooptical panel;
applying liquid crystal on a display area of the substrate with a droplet-discharging method, such that a display area edge of the sealant lies away from a drop center of a liquid-crystal droplet applied on an outermost circumference of the display area of the substrate by more than half of an eventual spread diameter of the liquid-crystal droplet.

4. The method for manufacturing an electrooptical panel according to claim 3, wherein the eventual spread diameter of the liquid-crystal droplet is determined after a lapse of 30 minutes after the liquid-crystal droplet accretes onto an alignment layer.

5. The method for manufacturing an electrooptical panel according to claim 4, wherein the diameter of the liquid-crystal droplet extends parallel to a rubbing direction.

6. A program for manufacturing an electrooptical panel, enabling a computer to achieve a process for dropping a liquid-crystal droplet, wherein upon applying liquid crystal on a display area of a substrate included in the electrooptical panel with a droplet-discharging method, the droplet lies away from a display area edge of a sealant applied on an outer circumference of the substrate by more than half of an eventual spread diameter of the liquid-crystal droplet.

7. A program for manufacturing an electrooptical panel, enabling a computer to achieve a process for applying a sealant for sealing liquid crystal on a substrate included in the electrooptical panel, wherein upon applying the liquid crystal on a display area of the substrate with a droplet-discharging method, a display area edge of the sealant lies away from a drop center of the liquid-crystal droplet applied on an outermost circumference of the display area of the substrate by more than half of an eventual spread diameter of the liquid-crystal droplet.

8. An apparatus for manufacturing an electrooptical panel, comprising:
- a stage on which a substrate included in the electrooptical panel is placed;
- a droplet-discharging head including a plurality of nozzles disposed at a predetermined pitch, each nozzle selectively discharging a liquid-crystal droplet onto the substrate; and
- a controller for dropping the liquid-crystal droplet so as to lie away from the a display area edge of a sealant for sealing the liquid crystal and applied on an outer circumference of the substrate by more than half of an eventual spread diameter of the liquid-crystal droplet.

9. The apparatus for manufacturing an electrooptical panel according to claim 8, wherein no liquid-crystal droplet is discharged from at least one of the nozzles facing at least one side of the sealant extending parallel to a drawing direction of the droplet-discharging head.

* * * * *